United States Patent
Jang et al.

(10) Patent No.: US 12,255,351 B2
(45) Date of Patent: Mar. 18, 2025

(54) SEPARATOR FOR ELECTROCHEMICAL DEVICE AND METHOD FOR MANUFACTURING THE SAME

(71) Applicant: LG CHEM, LTD., Seoul (KR)

(72) Inventors: Dae-Sung Jang, Daejeon (KR); Dong-Wook Sung, Daejeon (KR); So-Mi Jeong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 833 days.

(21) Appl. No.: 17/251,413

(22) PCT Filed: Oct. 29, 2019

(86) PCT No.: PCT/KR2019/014401
§ 371 (c)(1),
(2) Date: Dec. 11, 2020

(87) PCT Pub. No.: WO2020/091396
PCT Pub. Date: May 7, 2020

(65) Prior Publication Data
US 2021/0280944 A1    Sep. 9, 2021

(30) Foreign Application Priority Data

Oct. 29, 2018 (KR) .................. 10-2018-0130072

(51) Int. Cl.
*H01M 50/46* (2021.01)
*C08F 214/22* (2006.01)
(Continued)

(52) U.S. Cl.
CPC ......... *H01M 50/449* (2021.01); *C08F 214/22* (2013.01); *H01M 10/0525* (2013.01);
(Continued)

(58) Field of Classification Search
CPC .......... H01M 50/449; H01M 10/0525; H01M 50/426; H01M 50/443; H01M 50/446;
(Continued)

(56) References Cited

U.S. PATENT DOCUMENTS

2008/0292968 A1* 11/2008 Lee ............... H01M 10/052
429/247
2015/0086859 A1* 3/2015 Chang ............ H01M 10/054
429/188
(Continued)

FOREIGN PATENT DOCUMENTS

CN    106910859 A    6/2017
JP    10-101726 A    4/1998
(Continued)

OTHER PUBLICATIONS

International Search Report for PCT/KR2019/014401 (PCT/ISA/210) mailed on Feb. 21, 2020.
(Continued)

*Primary Examiner* — Christian Roldan
(74) *Attorney, Agent, or Firm* — Birch, Stewart, Kolasch & Birch, LLP

(57) ABSTRACT

A separator for an electrochemical device, including a porous polymer substrate and an inorganic coating layer formed on at least one surface of the porous polymer substrate. The inorganic coating layer includes inorganic particles and a binder resin. The binder resin includes a polyvinylidene fluoride (PVdF)-based polymer having a main chain, and at least one hydrogen atom in the main chain of the PVdF-based polymer is substituted with an acrylic compound-derived functional group.

13 Claims, 1 Drawing Sheet

(51) Int. Cl.
*H01M 10/0525* (2010.01)
*H01M 50/426* (2021.01)
*H01M 50/443* (2021.01)
*H01M 50/446* (2021.01)
*H01M 50/449* (2021.01)

(52) U.S. Cl.
CPC ....... *H01M 50/426* (2021.01); *H01M 50/443* (2021.01); *H01M 50/446* (2021.01); *H01M 50/461* (2021.01)

(58) Field of Classification Search
CPC .............. H01M 50/461; H01M 50/403; H01M 50/451; H01M 50/42; H01M 50/431; H01M 50/457; H01M 50/491; C08F 214/22; Y02E 60/10; Y02P 70/50
USPC ......................................................... 429/144
See application file for complete search history.

(56) References Cited

U.S. PATENT DOCUMENTS

| | | | | |
|---|---|---|---|---|
| 2015/0104692 | A1* | 4/2015 | Nakamura | H01M 10/0525 429/150 |
| 2015/0155539 | A1 | 6/2015 | Park et al. | |
| 2017/0179456 | A1* | 6/2017 | Kim | H01M 50/426 |
| 2018/0034025 | A1 | 2/2018 | Lee et al. | |
| 2019/0245183 | A1 | 8/2019 | Jeong et al. | |

FOREIGN PATENT DOCUMENTS

| | | |
|---|---|---|
| JP | 3784494 B2 | 6/2006 |
| JP | 2015-76350 A | 4/2015 |
| KR | 10-2009-0024393 A | 3/2009 |
| KR | 10-2015-0063870 A | 6/2015 |
| KR | 10-2016-0066498 A | 6/2016 |
| KR | 10-2016-0129598 A | 11/2016 |
| KR | 10-2016-0129762 A | 11/2016 |
| KR | 10-2016-0149042 A | 12/2016 |
| KR | 10-1701332 B1 | 2/2017 |
| KR | 10-2017-0098146 A | 8/2017 |
| KR | 10-2017-0127256 A | 11/2017 |
| WO | WO 2018/147714 A1 | 8/2018 |

OTHER PUBLICATIONS

Lee et al., "Robust nanogenerators based on graft copolymers via control of dielectrics for remarkable output power enhancement", Science Advances, Research Article, 2017; 3:e1602902, May 26, 2017, pp. 1-9, total of 11 pages.

Rashid et al., "Hydrophobicity Enhancement of Poly (Vinylidene Fluoride-co-Hexafluoro Propylene) for Membrane Distillation", Journal of Polymer Science and Technology 1(1) 2015, pp. 1-9.

European Search Report for Appl. No. 19878162.7 dated Oct. 26, 2021.

* cited by examiner

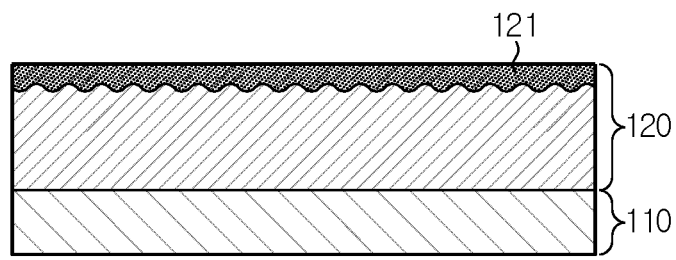

SEPARATOR FOR ELECTROCHEMICAL DEVICE AND METHOD FOR MANUFACTURING THE SAME

TECHNICAL FIELD

The present application claims priority to Korean Patent Application No. 10-2018-0130072 filed on Oct. 29, 2018 in the Republic of Korea. The present disclosure relates to a separator for an electrochemical device, wherein the electrochemical device may be a primary battery or secondary battery and the secondary battery includes a lithium ion secondary battery.

BACKGROUND ART

Non-aqueous secondary batteries represented by lithium ion secondary batteries have been used widely as electric power sources for portable electronic instruments, such as notebook PCs, cellular phones, digital cameras, camcorders, or the like. In addition, recently, such batteries have been examined about their application to vehicles by virtue of their characteristic high energy density.

As portable electronic instruments have been downsized and weight-lightened, outer casings for non-aqueous secondary batteries have been simplified. At the initial stage, battery cans made of stainless steel were used as outer casings. However, since outer casings made of aluminum were developed, soft pack outer casings made of aluminum laminate packs have been developed recently. In the case of soft pack outer casings made of aluminum laminate packs, they are flexible, and thus may form a gap between an electrode and a separator during charge/discharge to cause a technical problem of degradation of cycle life. To solve the above-mentioned problem, technology of adhesion between an electrode and a separator is important, and many suggestions have been made about the technology.

In addition, when a curved battery is manufactured, an electrode assembly including a separator bound to electrodes is subjected to deformation, such as bending. When the binding force between an electrode and a separator is low, they may be separated from each other upon such deformation. As a result, no electrochemical reaction may occur between the electrode and separator, or a dead space having low efficiency may be generated, resulting in a problem of degradation of battery quality.

In general, polyvinylidene fluoride (PVdF)-based resin is used as a binder resin for an electrode adhesive layer. In addition, the binder resin is allowed to migrate toward the surface of the separator through a humidified phase separation process so that an adhesive top layer portion having a high content of binder resin may be formed near the surface of an inorganic coating layer. However, PVdF-based resin itself does not have high adhesion, and thus hardly ensures a high level of binding force. To improve the adhesion, the content or coating amount of binder resin may be increased. However, in this case, the resultant adhesive layer has an increased thickness to cause a decrease in energy density and an increase in resistance undesirably. It is required for the adhesive layer of a separator to accomplish high adhesion and high ion conductivity, even when it has a small thickness. In addition, a separator should be a chemically and electrochemically stable material in order to use a battery stably for a long time. Further, a process for manufacturing a separator should provide high productivity to allow mass production at low cost. Under these circumstances, there is a need for developing a separator for a secondary battery satisfying the above-mentioned requirements.

DISCLOSURE

Technical Problem

The present disclosure is directed to providing a separator which has a small thickness and includes an inorganic coating layer having improved adhesion to an electrode. The present disclosure is also directed to providing a method for manufacturing a separator having the above-mentioned characteristics. It will be easily understood that the objects and advantages of the present disclosure may be realized by the means shown in the appended claims and combinations thereof.

Technical Solution

In one aspect of the present disclosure, there is provided a separator for an electrochemical device. According to the first embodiment of the present disclosure, there is provided a separator for an electrochemical device, including a porous polymer substrate and an inorganic coating layer formed on at least one surface of the porous polymer substrate, wherein the inorganic coating layer includes inorganic particles and a binder resin, the binder resin includes a polyvinylidene fluoride (PVdF)-based polymer, and at least one hydrogen atom in the main chain of the PVdF-based polymer is substituted with an acrylic compound-derived functional group.

According to the second embodiment of the present disclosure, there is provided the separator for an electrochemical device as defined in the first embodiment, wherein the polyvinylidene fluoride (PVdF)-based polymer includes a polymer represented by the following [Chemical Formula 1], wherein each of R1 and R2 independently represents H or a group represented by the following [Chemical Formula 2], wherein each of R3, R4 and R5 independently represents H or a C10 or lower alkyl group.

[Chemical Formula 1]

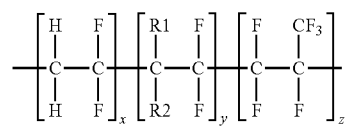

[Chemical Formula 2]

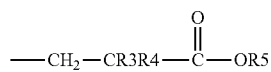

According to the third embodiment of the present disclosure, there is provided the separator for an electrochemical device as defined in the second embodiment, wherein each of R3, R4 and R5 is independently substituted with an element other than H or a functional group in at least one hydrogen bound to each carbon atom, and the functional group is at least one selected from ester, ketone, hydroxyl, ether, carboxyl and carbonyl groups.

According to the fourth embodiment of the present disclosure, there is provided the separator for an electrochemical device as defined in any one of the first to the third embodiments, wherein the main chain of the PVdF-based polymer includes a copolymer of vinylidene fluoride with a monomer copolymerizable with vinylidene fluoride, wherein the monomer is at least one selected from: trifluoroethylene (TrFE); chlorofluoroethylene (CTFE); 1,2-difluoroethylene; tetrafluoroethylene (TFE); hexafluoropropylene (HFP); perfluoro(alkylvinyl)ether, such as perfluoro (methylvinyl)ether (PMVE), perfluoro(ethylvinyl)ether (PEVE) or perfluoro(propylvinyl)ether (PPVE); perfluoro(1,3-dioxole); and perfluoro (2,2-dimethyl-1,3-dioxole (PDD), and the substitution ratio with the monomer is 1-20 wt %.

According to the fifth embodiment of the present disclosure, there is provided the separator for an electrochemical device as defined in any one of the first to the fourth embodiments, wherein the acrylic compound-derived functional group is derived from at least one selected from (meth)acrylic acid, (meth)acrylate, propyl acrylate, isopropyl acrylate, n-butyl acrylate, isobutyl acrylate, n-amyl acrylate, isoamyl acrylate, n-ethylhexyl acrylate, 2-ethylhexyl acrylate, 2-hydroxyethyl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, n-ethylhexyl methacrylate, 2-ethylhexyl methacrylate, hydroxyethyl methacrylate, (meth)acrylonitrile butyl (meth)acrylate, 2-ethylhexyl (meth)acrylate, ethyl (meth)acrylate, methyl (meth)acrylate, n-propyl (meth)acrylate, isopropyl (meth)acrylate, t-butyl (meth)acrylate, pentyl (meth)acrylate, n-octyl (meth)acrylate, isooctyl (meth)acrylate, isononyl (meth)acrylate, lauryl (meth)acrylate, tetradecyl (meth)acrylate and dimethyl 2-methylenepentanedionate hydroxypropyl methacrylate.

According to the sixth embodiment of the present disclosure, there is provided the separator for an electrochemical device as defined in any one of the first to the fifth embodiments, wherein the PVdF polymer includes the acrylic compound-derived functional group at a ratio of 0.1 wt % to 5 wt % based on 100 wt % of the PVdF polymer.

According to the seventh embodiment of the present disclosure, there is provided the separator for an electrochemical device as defined in any one of the first to the sixth embodiments, wherein the PVdF-based polymer has a weight average molecular weight of 100,000 to 600,000.

According to the eighth embodiment of the present disclosure, there is provided the separator for an electrochemical device as defined in any one of the first to the seventh embodiments, wherein the inorganic coating layer includes the inorganic particles in an amount of 50 wt % or more based on 100 wt % of the total weight of the inorganic particles and the binder resin.

According to the ninth embodiment of the present disclosure, there is provided the separator for an electrochemical device as defined in any one of the first to the eighth embodiments, wherein a portion of the inorganic coating layer at a surface of the inorganic coating layer opposite the porous polymer substrate forms an electrode adhesive portion, wherein the electrode adhesive portion has a content of binder resin that is higher than a content of binder resin in the remainder of the inorganic coating layer adjacent to the porous polymer substrate.

According to the tenth embodiment of the present disclosure, there is provided the separator for an electrochemical device as defined in any one of the first to the ninth embodiments, wherein the inorganic particles in the inorganic coating layer are bound to each other by the binder resin, wherein the inorganic coating layer has a plurality of micropores derived from interstitial volumes formed among the inorganic particles, wherein the inorganic coating layer has an electrode adhesive portion having a high content of binder resin that is higher than the remainder of the inorganic coating layer adjacent to the porous polymer substrate, and wherein the electrode adhesive portion is formed on the surface portion of the inorganic coating layer opposite the porous polymer substrate, and the inorganic coating layer and the electrode adhesive portion are bound integrally and indivisibly to each other.

According to the eleventh embodiment of the present disclosure, there is provided the separator for an electrochemical device as defined in any one of the first to the tenth embodiments, wherein the electrode adhesive portion is formed by a phase separation process of the binder resin, while drying the separator under a humidified condition.

According to the twelfth embodiment of the present disclosure, there is provided the separator for an electrochemical device as defined in the eleventh embodiment, wherein the humidified condition includes a relative humidity of 40% to 80%.

According to the thirteenth embodiment of the present disclosure, there is provided an electrochemical device including a negative electrode, a positive electrode and a separator interposed between the negative electrode and the positive electrode, wherein the separator is defined in any one of the first to the twelfth embodiments.

Advantageous Effects

The separator and electrochemical device including the same according to the present disclosure show excellent adhesion to an electrode by using a binder having an acrylic monomer introduced thereto. It is possible to apply different variations to processes for assemblage of electrochemical devices with no problem of degradation of adhesion by using the realized high adhesion. In addition, it is possible to improve peel strength between the inorganic coating layer and the separator substrate by virtue of the introduction of the binder resin, and thus to provide improved heat resistance and stability, such as a reduced shrinkage of the separator. Further, it is possible to accomplish thin filming of separators, thereby improving the energy density of a battery effectively.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

The FIGURE is a schematic view illustrating the sectional structure of the separator according to an embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part 「includes」 an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

Unless otherwise stated, ratios stated herein refer to weight ratios.

The present disclosure relates to a separator for an electrochemical device and an electrochemical device including the same. As used herein, the term 'electrochemical device' means a device converting chemical energy into electrical energy by electrochemical reactions and has a concept covering a primary battery and a secondary battery, wherein the secondary battery is rechargeable and has a concept covering a lithium ion battery, nickel-cadmium battery, nickel metal hydride battery, or the like.

1. Separator
1) Structure of Separator

The separator 100 according to the present disclosure includes a porous polymer substrate 110 and an inorganic coating layer 120 formed on at least one surface of the porous polymer substrate. The inorganic coating layer includes inorganic particles and a binder resin. The binder resin includes a polyvinylidene fluoride (PVdF)-based polymer, and at least one hydrogen atom in the main chain of the PVdF-based polymer is substituted with an acrylic compound-derived functional group. In other words, the PVdF copolymer is characterized in that it is modified with acrylic monomer. In addition, according to an embodiment of the present disclosure, the inorganic coating layer has a top layer portion having a high content of binder resin, and thus shows high adhesion between the separator and an electrode.

According to an embodiment of the present disclosure, the separator may have a thickness of 5-30 μm and the thickness may be controlled suitably within the above-defined range. For example, the thickness may be 15-25 μm. In addition, the separator may have a permeability of about 50 sec/100 cc to 3000 sec/100 cc.

As used herein, the term 'permeability' means a time required for 100 cc of air to pass through an object, such as a separator or porous polymer substrate, to be tested for permeability, is expressed in the unit of second/100 cc, may be used exchangeably with 'transmission', and is generally represented by Gurley value, or the like. According to an embodiment of the present disclosure, the permeability may be determined according to JIS P8117. In addition, air permeability P1 determined for an object having a thickness of T1 may be converted into air permeability P2 of the object having a thickness of 20 μm according to the mathematical formula of $P2=(P1\times20)/T1$.

Meanwhile, according to the present disclosure, the porosity and pore size may be determined by BELSORP (BET apparatus) available from BEL JAPAN Co. using an adsorption gas, such as nitrogen, or through a method, such as mercury intrusion porosimetry or capillary flow porosimetry. According to an embodiment of the present disclosure, the thickness and weight of the resultant coating layer may be measured to calculate porosity from the theoretical density of the coating layer.

2) Porous Polymer Substrate

The porous polymer substrate means a porous ion-conducting barrier which allows ions to pass therethrough while interrupting an electrical contact between a negative electrode and a positive electrode, and has a plurality of pores formed therein. The pores are interconnected so that gases or liquids may pass from one surface of the substrate to the other surface of the substrate.

Materials forming the porous polymer substrate may be any organic materials or inorganic materials having electrical insulation property. Particularly, with a view to imparting a shut-down function to a substrate, it is preferred to use a thermoplastic resin as a material forming the substrate. Herein, the term 'shut-down function' means a function of preventing thermal runaway of a battery by allowing a thermoplastic resin to be molten so that the pores of the porous substrate may be closed and ion conduction may be interrupted, when the battery temperature is increased. As a thermoplastic resin, a thermoplastic resin having a melting point less than 200° C. is suitable, polyolefin being particularly preferred.

In addition to polyolefin, the thermoplastic resin may further include at least one polymer resin selected from polyethylene terephthalate, polybutylene terephthalate, polyacetal, polyamide, polycarbonate, polyimide, polyetherether ketone, polyether sulfone, polyphenylene oxide, polyphenylene sulfide and polyethylene naphthalene. The porous polymer substrate may include a non-woven web, a porous polymer film, or a laminate of two or more layers thereof, but is not limited thereto.

Particularly, the porous polymer substrate is any one of the following a) to e):

a) A porous film formed by melting/extruding a polymer resin;
b) A multilayer film formed by stacking two or more layers of the porous films of a);
c) A non-woven web formed by integrating filaments obtained by melting/spinning a polymer resin;
d) A multilayer film formed by stacking two or more layers of the non-woven webs of c); and
e) A porous composite film having a multilayer structure including two or more of a) to d).

According to the present disclosure, the porous polymer substrate preferably has a thickness of 3-12 μm, or 5-12 μm. When the thickness is smaller than the above-defined range, it is not possible to obtain a sufficient conducting barrier function. On the other hand, when the thickness is excessively larger than the above-defined range (i.e. the porous polymer substrate is excessively thick), the separator may show excessively increased resistance.

According to an embodiment of the present disclosure, the polyolefin preferably has a weight average molecular weight of 100,000-5,000,000. When the weight average molecular weight is smaller than 100,000, it is difficult to ensure sufficient dynamic physical properties. In addition, when the weight average molecular weight is larger than 5,000,000, shut-down characteristics may be degraded or molding may become difficult.

As used herein, the term 'molecular weight' refers to weight average molecular weight ($M_w$). For example, the molecular weight may be determined by using gel permeation chromatography (GPC) (PL GPC220, Agilent Technologies).

In addition, the porous polymer substrate may have a puncture strength of 300 gf or more in terms of improvement of production yield. The puncture strength of a porous substrate refers to the highest puncture load (go measured by carrying out a puncture test with Kato tech KES-G5 handy compression tester under the conditions of a needle tip radius of curvature of 0.5 mm and a puncture rate of 2 mm/sec.

According to an embodiment of the present disclosure, the porous polymer substrate may be any porous polymer substrate, as long as it is a planar porous polymer substrate used for an electrochemical device. For example, an insulating thin film showing high ion permeability and mechanical strength and generally having a pore diameter of 10-100 nm and a thickness of 5-12 μm may be used.

3) Inorganic Coating Layer

According to the present disclosure, the separator includes an inorganic coating layer formed on at least one surface of the porous polymer substrate. The inorganic coating layer includes a mixture containing a binder resin and inorganic particles. In the inorganic coating layer, the inorganic particles are attached to one another (i.e. the binder resin connects the inorganic particles among themselves and fixes them) so that the inorganic particles may retain their binding states. According to an embodiment of the present disclosure, the inorganic particles are closely packed in the inorganic coating layer and the inorganic coating layer may have a plurality of micropores derived from the interstitial volumes formed among the inorganic particles. The micropores are interconnected to provide a porous structure which allows gases or liquids to pass from one surface to the other surface. According to an embodiment of the present disclosure, the inorganic particles are totally or partially surface-coated with the binder resin and are bound to one another in a face-to-face or dot-to-dot manner by means of the binder resin. According to an embodiment of the present disclosure, the inorganic particles may be present in an amount of 50 wt % or more, preferably 60 wt % or more, 70 wt % or more, or 80 wt % or more, based on 100 wt % of the combined weight of the binder resin and the inorganic particles. Within the above-defined range, the inorganic particles may also be present in an amount of 95 wt % or less, or 90 wt % or less, based on 100 wt % of the combined weight of the binder resin and the inorganic particles.

The inorganic coating layer preferably has a thickness of 1-5 μm on one surface of the porous substrate. Preferably, the thickness may be 3 μm or more. Within the above-defined range, it is possible to provide excellent adhesion to an electrode, thereby providing increased cell strength of the battery. Meanwhile, an inorganic coating layer thickness of 4 μm or less is advisable in terms of cycle characteristics and resistance characteristics of the battery.

Meanwhile, according to the present disclosure, the inorganic coating layer is provided with an electrode adhesive portion 121 having a high content of binder resin at the top layer portion thereof by virtue of the characteristics of the method for manufacturing a separator described hereinafter. The FIGURE is a schematic view illustrating the sectional structure of the separator 100 according to an embodiment of the present disclosure. Referring to The FIGURE, the separator according to the present disclosure includes an inorganic coating layer 120 formed on the surface of a porous polymer substrate 110, wherein the binder resin is distributed at a higher concentration at the top layer portion of the inorganic coating layer as compared to the other portions. For the convenience of description, the top layer portion in which the binder resin is distributed at a higher concentration will be referred to as 'electrode adhesive portion 121' hereinafter. According to an embodiment of the present disclosure, the electrode adhesive portion results from the migration of the binder resin toward the top layer portion through a process, such as humidified phase separation. Therefore, the electrode adhesive portion is not a structure separated physically from the inorganic coating layer but is bound integrally and indivisibly to the surface of the inorganic coating layer as a part of the inorganic coating layer. In addition, the thickness of the electrode adhesive portion may not be uniform. According to an embodiment of the present disclosure, the electrode adhesive portion may be defined as a portion containing the binder resin in an amount of 70 wt % or more, preferably 85 wt % or more, from the topmost portion in the thickness direction of the inorganic coating layer.

B. Materials for Inorganic Coating Layer

B1. Binder Resin

According to an embodiment of the present disclosure, the inorganic coating layer includes a polyvinylidene fluoride (PVdF)-based polymer as a binder resin. At least one hydrogen atom in the main chain of the PVdF-based polymer is substituted with an acrylic compound-derived functional group. The PVdF-based polymer has higher adhesion as compared to a binder resin having no acrylic compound-derived functional group, and thus can ensure adhesion to such a level that cannot be realized by the other PVdF-based binder resins having the same molecular weight and/or having the same substitution ratio with another monomer, such as hexafluoropropylene (HFP). In addition, the binder polymer provides an effect of improving adhesion in a wet state after the injection of an electrolyte, i.e. in such a state that the separator is impregnated with an electrolyte.

According to the present disclosure, the PVdF-based polymer includes, as its main chain, a copolymer of vinylidene fluoride (VDF) with a monomer copolymerizable with vinylidene fluoride. According to an embodiment of the present disclosure, particular examples of the monomer may include at least one of trifluoroethylene (TrFE); chlorofluoroethylene (CTFE); 1,2-difluoroethylene; tetrafluoroethylene (TFE); hexafluoropropylene (HFP); perfluoro(alkylvinyl)ether, such as perfluoro(methylvinyl)ether (PMVE), perfluoro(ethylvinyl)ether (PEVE) or perfluoro(propylvinyl)ether (PPVE); perfluoro(1,3-dioxole); and perfluoro(2,2-dimethyl-1,3-dioxole (PDD). According to an embodiment of the present disclosure, the PVdF-based polymer may include at least one selected from polyvinylidene fluoride-hexafluoropropylene (PVdF-HFP), polyvinylidene fluoride-chlorotrifluoroethylene (PVdF-CTFE), polyvinylidene fluoride-trichloroethylene (PVdF-TrFE), polyvinylidene fluoride-tetrafluoroethylene (PVdF-TFE), or the like According to an embodiment of the present disclosure, the PVdF-based polymer has a substitution ratio with the monomer of 1-20 wt %, preferably 2-15 wt %. When the substitution ratio is lower than the above-defined range, the binder resin has an increased melting point ($T_m$) to cause degradation of adhesion. According to an embodiment of the present disclosure, the substitution ratio with the monomer may be determined based on the integration of characteristic peaks of the monomer determined in $^1$H NMR (nuclear magnetic resonance) spectroscopy. With reference to analysis of substitution ratio, refer to Journal of Materials Chemistry, 2012, 22, 341 or AMT-3412-Ok. Determination through NMR spectroscopy may be carried out by using a suitable instrument, such as Bruker Avance III HD 700 MHz NMR or Varian 500 MHz NMR.

According to an embodiment of the present disclosure, the binder resin may include a polyvinylidene fluoride (PVdF)-based polymer having an acrylic compound-derived functional group introduced thereto. For example, the PVdF-based polymer may be represented by the following [Chemical Formula 1]. In [Chemical Formula 1], at least one hydrogen atom in the main chain of PVdF-HFP is substituted with an acrylic compound-derived functional group.

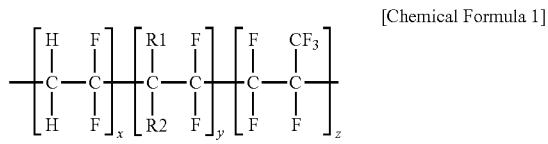

[Chemical Formula 1]

In [Chemical Formula 1], each of R1 and R2 independently represents H or a group represented by the following [Chemical Formula 2], and each of x, y and z is an integer of 1 or more.

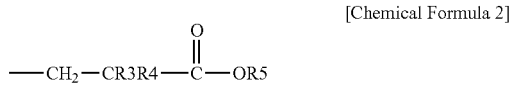

[Chemical Formula 2]

In [Chemical Formula 2], each of R3, R4 and R5 may independently represent H or a C10 or lower alkyl group. In addition, each hydrogen atom bound to each carbon atom of R3, R4 and R5 may be independently substituted with an element other than H or a functional group. The functional group may include at least one of ester, ketone, hydroxyl, ether, carboxyl and carbonyl groups.

According to an embodiment of the present disclosure, the acrylic compound-derived functional group may be derived from at least one selected from (meth)acrylic acid, (meth)acrylate, propyl acrylate, isopropyl acrylate, n-butyl acrylate, isobutyl acrylate, n-amyl acrylate, isoamyl acrylate, n-ethylhexyl acrylate, 2-ethylhexyl acrylate, 2-hydroxyethyl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, n-ethylhexyl methacrylate, 2-ethylhexyl methacrylate, hydroxyethyl methacrylate, (meth)acrylonitrile butyl (meth)acrylate, 2-ethylhexyl (meth)acrylate, ethyl (meth)acrylate, methyl (meth)acrylate, n-propyl (meth)acrylate, isopropyl (meth) acrylate, t-butyl (meth)acrylate, pentyl (meth)acrylate, n-octyl (meth)acrylate, isooctyl (meth)acrylate, isononyl (meth) acrylate, lauryl (meth)acrylate, tetradecyl (meth)acrylate, dimethyl 2-methylenepentanedionate hydroxypropyl methacrylate, or the like.

According to an embodiment of the present disclosure, the PVdF-based polymer may include at least one compound represented by [Chemical Formula 2].

According to the present disclosure, the acrylic compound-derived functional group may be introduced to the PVdF-based polymer in an amount of 0.1-5 wt %, preferably 0.1-3 wt %. When the content of the acrylic compound-derived functional group is excessively high, formation of an adhesive portion may be interrupted. When the content of the acrylic compound-derived functional group is lower than the above-defined range, it is not possible to realize a desired level of adhesion, even if an adhesive portion is formed.

According to an embodiment of the present disclosure, the content of the acrylic compound-derived functional group introduced to the PVdF-based polymer may be determined based on the integration of characteristic peaks of the monomer determined in $^1$NMR (nuclear magnetic resonance) spectroscopy. With reference to analysis of substitution ratio, refer to Journal of Materials Chemistry, 2012, 22, 341 or AMT-3412-Ok. Determination through NMR spectroscopy may be carried out by using a suitable instrument, such as Bruker Avance III HD 700 MHz NMR or Varian 500 MHz NMR.

According to an embodiment of the present disclosure, the PVdF-based polymer may have a weight average molecular weight of 100,000-800,000, preferably 100,000-600,000. For example, the PVdF-based polymer may have a weight average molecular weight of 300,000-500,000. When the weight average molecular weight is excessively large, formation of an adhesive portion on the surface of the inorganic coating layer is delayed as described hereinafter, thereby making it difficult to realize adhesion. When the weight average molecular weight is excessively small, an adhesive portion may be formed rapidly. However, in this case, the content of binder resin in the inorganic coating layer is low, and thus binding force among the inorganic particles or peel strength between the inorganic particles and the substrate may be degraded.

As used herein, the term 'molecular weight' refers to weight average molecular weight ($M_w$) and may be expressed in the unit of g/mol. In addition, the molecular weight may be determined, for example, by using gel permeation chromatography (GPC, PL GPC220, Agilent Technologies).

According to an embodiment of the present disclosure, a method for preparing the PVdF-based polymer to which the acrylic compound-derived functional group is introduced are not particularly limited, as long as it can provide the polymer having the above-mentioned characteristics. For example, the method disclosed in Korean Patent Publication No. 10-1298507 may be used.

According to an embodiment of the present disclosure, the PVdF-based polymer having the acrylic compound-derived functional group introduced thereto may be obtained by a method of polymerizing monomers in an aqueous medium by using a surfactant. For example, the polymerization may be carried out by introducing water, at least one non-fluorinated surfactant, at least one monomer, at least one acrylic compound and a polymerization initiator to a reactor, and inducing polymerization. Refer to the above description about vinylidene fluoride (VDF) and a monomer copolymerizable with vinylidene fluoride. Preferably, the monomer may include vinylidene fluoride and hexafluoropropylene (HFP). In addition, refer to the above-description about the acrylic compound. The non-fluorinated surfactant may include at least one selected from polyacrylic acid, polyvinyl sulfonic acid and polyvinyl phosphonic acid. The polymerization initiator is a chemical capable of providing free radical sources, and persulfate or organic peroxide compound may be used as a polymerization initiator.

The polymerization may be carried out at a temperature of about 35-130° C., optionally under a pressure of about 2,000-11,000 KPa. In addition, the polymerization is carried out preferably under agitation. The polymer obtained by the above-mentioned method may have a shape of latex.

Meanwhile, according to an embodiment of the present disclosure, the PVdF-based polymer having the acrylic compound-derived functional group introduced thereto may be obtained by light irradiation or electron beam irradiation of the PVdF-based polymer having no acrylic compound-derived functional group introduced thereto and the acrylic compound. For example, a method which includes preparing a granular or powdery blend containing PVdF-HFP and the acrylic compound, and irradiating photons or electrons to the blend under an oxygen-free condition may be used to introduce the acrylic compound to the PVdF-HFP chain.

According to an embodiment of the present disclosure, if necessary, the inorganic coating layer may further include a second binder resin, besides the PVdF-based copolymer. Particular examples of the second binder resin may include but are not limited to: polymethyl methacrylate, polybutyl acrylate, polybutyl methacrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinyl alcohol, cyanoethyl cellulose, cyanoethyl sucrose, pullulan, carboxymethyl cellulose, or the like. The content of the second binder resin may be controlled adequately considering adhesion. For example, the second binder may be used in an amount of 10 wt % or less based on 100 wt % of the binder resin.

According to an embodiment of the present disclosure, the inorganic coating layer may further include additives, such as a dispersing agent and/or thickening agent, in an amount of 1-3 wt % based on 100 wt % of the inorganic coating layer. According to an embodiment of the present disclosure, the additive may be at least one selected suitably from polyvinyl pyrrolidone (PVP), polyvinyl alcohol (PVA), hydroxyethyl cellulose (HEC), hydroxypropyl cellulose (HPC), ethylhydroxyethyl cellulose (EHEC), methyl cellulose (MC), carboxymethyl cellulose (CMC), hydroxyalkyl-methyl cellulose, and cyanoethyl polyvinyl alcohol.

B2. Inorganic Particles

According to a particular embodiment of the present disclosure, there is no particular limitation in the inorganic particles, as long as they are electrochemically stable. In other words, there is no particular limitation in the inorganic particles that may be used herein, as long as they cause no oxidation and/or reduction in the range (e.g. 0-5V based on Li/Li$^+$) of operating voltage of an applicable electrochemical device. Particularly, when using inorganic particles having a high dielectric constant as the inorganic particles, it is possible to improve the ion conductivity of an electrolyte by increasing the dissociation degree of an electrolyte salt, such as a lithium salt, in a liquid electrolyte.

For the above-mentioned reasons, the inorganic particles may be high-dielectric constant inorganic particles having a dielectric constant of 5 or more, preferably 10 or more. Non-limiting examples of the inorganic particles having a dielectric constant of 5 or more may include $BaTiO_3$, $Pb(Zr,Ti)O_3$ (PZT, wherein $0<x<1$), $Pb_{1-x}La_xZr_{1-y}Ti_yO_3$ (PLZT, wherein $0<x<1$, $0<y<1$), $Pb(Mg_{1/3}Nb_{2/3})O_3PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$, or a mixture thereof.

In addition, as inorganic particles, it is possible to use inorganic particles having lithium ion transportability, i.e. inorganic particles which contain lithium elements and do not store lithium but transport lithium ions. Non-limiting examples of the inorganic particles having lithium ion transportability include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($1<x<4$, $0<y<13$), such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$, lithium nitride ($Li_xN_y$, $0<x<4$, $0<y<2$), such as $Li_3N$, $SiS_2$-based glass ($Li_xSi_yS_z$, $0<x<3$, $0<y<2$, $0<z<4$), such as $Li_3PO_4$—$Li_2S$—$SiS_2$, and $P_2S_5$-based glass ($Li_xP_yS_z$, $0<x<3$, $0<y<3$, $0<z<7$), such as LiI—$Li_2S$—$P_2S_5$, or a mixture of two or more of them.

In addition, there is no particular limitation in the average particle diameter of the inorganic particles. However, the inorganic particles preferably have an average particle diameter of 0.1-1.5 μm with a view to formation of a coating layer with a uniform thickness and suitable porosity. When the average particle diameter is smaller than 0.1 μm, dispersibility may be degraded. When the average particle diameter is larger than 1.5 μm, the resultant coating layer may have an increased thickness.

2. Method for Forming Inorganic Coating Layer

The method for manufacturing a separator according to an embodiment of the present disclosure includes: preparing slurry for an inorganic coating layer including inorganic particles, a binder resin and a solvent; and applying the slurry to at least one surface of a separator substrate, followed by drying. In addition, the drying step may be carried out under a humidified condition. In a variant, the drying step may be carried out by dipping the porous substrate coated with the slurry in a non-solvent to the binder resin, such as water or alcohol, to solidify the binder resin.

First, the binder resin is dissolved in a solvent to prepare a polymer binder solution. Next, the polymer binder solution is introduced to and mixed with a mixture containing the inorganic particles and solvent to prepare slurry for forming an inorganic coating layer. The inorganic particles may be added, after they are pulverized to a predetermined average particle diameter in advance. In a variant, the inorganic particles may be introduced, and then dispersed while they are controlled and pulverized to a predetermined average particle diameter through a ball milling process, or the like. If necessary, supplementary agents, such as a dispersing agent, may be further introduced to the mixture and/or slurry.

Then, the slurry is applied onto a porous polymer substrate and is allowed to stand under a humidified condition for a predetermined time to solidify (dry) the binder resin.

While the binder resin is solidified out under a humidified condition, phase separation of the binder resin occurs in the slurry. According to an embodiment of the present disclosure, the humidified condition may include a relative humidity of about 40-80%. During the phase separation, the solvent migrates toward the surface portion of the inorganic coating layer and the binder resin migrates toward the surface portion of the inorganic coating layer along with the migration of the solvent, thereby forming an electrode adhesive portion having a high content of binder resin at the top layer portion. As a result, according to the present disclosure, an electrode adhesive portion having a high content of binder is formed effectively at the top layer portion by the PVdF-based polymer, and an adequate amount of the acrylic compound-derived functional group is present in the binder resin distributed in the electrode adhesive portion so that high adhesion may be realized between an electrode and the separator.

The solvent may be an ingredient capable of dissolving the binder resin. Preferably, a ketone solvent may be used. According to an embodiment of the present disclosure, the solvent may be selected suitably from acetone, methyl ethyl ketone, N-methyl pyrrolidone, and polar amide solvents such as dimethyl acetamide, dimethyl formamide and diethyl formamide, but is not limited thereto.

The slurry may be applied through a conventional coating process, such as Mayer bar coating, die coating, reverse roll coating or gravure coating. When the inorganic coating layer is formed on both surfaces of the porous substrate, the coating solution may be applied to each surface and then humidified phase separation and drying may be carried out. However, it is preferred to apply the coating solution to both surfaces of the porous substrate at the same time, followed by humidified phase separation and drying, in terms of productivity.

3. Electrode Assembly Including Separator

Meanwhile, the present disclosure provides a secondary battery including the separator. The battery includes a negative electrode, a positive electrode and a separator interposed between the negative electrode and the positive electrode, wherein the separator is a low-resistance separator having the above-described characteristics.

According to the present disclosure, the positive electrode includes a positive electrode current collector and a positive electrode active material layer formed on at least one surface of the current collector and containing a positive electrode active material, a conductive material and a binder resin. The positive electrode active material may include any one selected from: layered compounds, such as lithium manganese composite oxide ($LiMn_2O_4$, $LiMnO_2$, etc.), lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $Li_aNi_xCo_yMn_zO_2$ ($0<a<1.5$, $0<[x, y, z]<1$, $x+y+z=1$), $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which Li is partially substituted with an alkaline earth metal ion; disulfide compounds; and $Fe_2(MoO_4)_3$; or a mixture of two or more of them.

According to the present disclosure, the negative electrode includes a negative electrode current collector, and a negative electrode active material layer formed on at least one surface of the current collector and containing a negative electrode active material, a conductive material and a binder resin. The negative electrode may include, as a negative electrode active material, any one selected from: lithium metal oxide; carbon such as non-graphitizable carbon or graphite-based carbon; metal composite oxides, such as $Li_xFe_2O_3$ ($0≤x≤1$), $Li_xWO_2$ ($0≤x≤1$), $Sn_xMe_{1-x}Me'_yO_z$ (Me:Mn, Fe, Pb, Ge; Me':Al, B, P, Si, elements of Group 1, 2 or 3 in the Periodic Table, halogen; $0<x≤1$; $1≤y≤3$; $1≤z≤8$); lithium metal; lithium alloy; silicon-based alloy; tin-based alloy; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; and titanium oxide; or a mixture of two or more of them.

According to an embodiment of the present disclosure, the conductive material may be any one selected from the group consisting of graphite, carbon black, carbon fibers or metal fibers, metal powder, conductive whiskers, conductive metal oxides, activated carbon and polyphenylene derivatives, or a mixture of two or more of such conductive materials. More particularly, the conductive material may be any one selected from natural graphite, artificial graphite, Super-P, acetylene black, Ketjen black, channel black, furnace black, lamp black, thermal black, denka black, aluminum powder, nickel powder, zinc oxide, potassium titanate and titanium dioxide, or a mixture of two or more such conductive materials.

The current collector is not particularly limited, as long as it causes no chemical change in the corresponding battery and has high conductivity. Particular examples of the current collector may include stainless steel, copper, aluminum, nickel, titanium, baked carbon, aluminum or stainless steel surface-treated with carbon, nickel, titanium or silver, or the like.

The binder resin may be a polymer used currently for an electrode in the art. Non-limiting examples of the binder resin include, but are not limited to: polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinyl alcohol, cyanoethyl cellulose, cyanoethyl sucrose, pullulan, and carboxymethyl cellulose.

The electrode assembly prepared as described above may be introduced to a suitable casing and an electrolyte may be injected thereto to obtain a battery.

According to the present disclosure, the electrolyte is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent selected from propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone), ester compounds and mixtures thereof. However, the present disclosure is not limited thereto.

Meanwhile, according to an embodiment of the present disclosure, the organic solvent includes an ester compound. Preferably, the ester compound may be used in an amount of 30 wt % or more, 50 wt % or more, 60 wt % or more, or 65 wt % or more, based on 100 wt % of the organic solvent.

According to an embodiment of the present disclosure, the ester compound includes at least one selected from the group consisting of isobutyl propionate, isoamyl propionate, isobutyl butyrate, isopropyl propionate, methyl propionate, ethyl propionate, propyl propionate, butyl propionate, methyl acetate, ethyl acetate, propyl acetate, butyl acetate, methyl butyrate, ethyl butyrate, propyl butyrate and butyl butyrate.

In addition, the present disclosure provides a battery module which includes a battery including the electrode assembly as a unit cell, a battery pack including the battery module, and a device including the battery pack as an electric power source. Particular examples of the device include, but are not limited to: power tools driven by the power of an electric motor; electric cars, including electric vehicles (EV), hybrid electric vehicles (HEV), plug-in hybrid electric vehicles (PHEV), or the like; electric two-wheeled vehicles, including E-bikes and E-scooters; electric golf carts; electric power storage systems; or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

(1) Manufacture of Separator

Example 1

First, $Al_2O_3$, PVdF-HFP (Arkema) and a dispersing agent (cyanoethyl polyvinyl alcohol) were introduced to acetone at a weight ratio of 90:9:1 to obtain slurry for forming an inorganic coating layer. The PVdF-HFP has a HFP substitution ratio of 8 wt % and includes a functional group derived from an acrylic compound (dimethyl 2-methylenepentanedionate) introduced in an amount of 1 wt %. In addition, the PVdF-HFP used as a binder resin has a molecular weight ($M_w$) of 450,000 g/mol. The slurry was applied to a separator (polyethylene, porosity 45%, thickness 9 μm) at a loading amount of 15 g/m² based on the area of the separator and dried under a humidified condition of a relative humidity of 55%. Then, the dried product was cut into a size of 60 mm (length)×25 mm (width) to obtain a separator.

Example 2

First, $Al_2O_3$, PVdF-HFP (Arkema) and a dispersing agent (cyanoethyl polyvinyl alcohol) were introduced to acetone at a weight ratio of 84:15:1 to obtain slurry for forming an inorganic coating layer. The PVdF-HFP has a HFP substitution ratio of 8 wt % and includes a functional group derived from an acrylic compound (dimethyl 2-methylenepentanedioate) introduced in an amount of 1 wt %. In addition, the PVdF-HFP used as a binder resin has a molecular weight ($M_w$) of 450,000 g/mol. The slurry was applied to a separator (polyethylene, porosity 45%, thickness 9 μm) at a loading amount of 15 g/m² based on the area of the separator and dried under a humidified condition of a relative humidity of 55%. Then, the dried product was cut into a size of 60 mm (length)×25 mm (width) to obtain a separator.

Example 3

First, $Al_2O_3$, PVdF-HFP (Arkema) and a dispersing agent (cyanoethyl polyvinyl alcohol) were introduced to acetone at a weight ratio of 78:20:2 to obtain slurry for forming an inorganic coating layer. The PVdF-HFP has a HFP substitution ratio of 8 wt % and includes a functional group derived from an acrylic compound (dimethyl 2-methylenepentanedionate) introduced in an amount of 1 wt %. In addition, the PVdF-HFP used as a binder resin has a molecular weight ($M_w$) of 450,000 g/mol. The slurry was applied to a separator (polyethylene, porosity 45%, thickness 9 μm) at a loading amount of 15 g/m² based on the area of the separator and dried under a humidified condition of a relative humidity of 55%. Then, the dried product was cut into a size of 60 mm (length)×25 mm (width) to obtain a separator.

Example 4

First, $Al_2O_3$, PVdF-HFP (Arkema) and a dispersing agent (cyanoethyl polyvinyl alcohol) were introduced to acetone at a weight ratio of 90:9:1 to obtain slurry for forming an inorganic coating layer. The PVdF-HFP has a HFP substitution ratio of 8 wt % and includes a functional group derived from an acrylic compound (dimethyl 2-methylenepentanedioate) introduced in an amount of 3 wt %. In addition, the PVdF-HFP used as a binder resin has a molecular weight ($M_w$) of 380,000 g/mol. The slurry was applied to a separator (polyethylene, porosity 45%, thickness 9 μm) at a loading amount of 15 g/m² based on the area of the separator and dried under a humidified condition of a relative humidity of 55%. Then, the dried product was cut into a size of 60 mm (length)×25 mm (width) to obtain a separator.

Example 5

First, $Al_2O_3$, PVdF-HFP (Arkema) and a dispersing agent (cyanoethyl polyvinyl alcohol) were introduced to acetone at a weight ratio of 90:9:1 to obtain slurry for forming an inorganic coating layer. The PVdF-HFP has a HFP substitution ratio of 15 wt % and includes a functional group derived from an acrylic compound (dimethyl 2-methylenepentanedioate) introduced in an amount of 1 wt %. In addition, the PVdF-HFP used as a binder resin has a molecular weight ($M_w$) of 500,000 g/mol. The slurry was applied to a separator (polyethylene, porosity 45%, thickness 9 μm) at a loading amount of 15 g/m² based on the area of the separator and dried under a humidified condition of a relative humidity of 55%. Then, the dried product was cut into a size of 60 mm (length)×25 mm (width) to obtain a separator.

Comparative Example 1

First, $Al_2O_3$, PVdF-HFP (Arkema) and a dispersing agent (cyanoethyl polyvinyl alcohol) were introduced to acetone at a weight ratio of 90:9:1 to obtain slurry for forming an inorganic coating layer. The PVdF-HFP has a HFP substitution ratio of 15 wt %. Meanwhile, the PVdF-HFP includes no acrylic compound-derived functional group introduced thereto, unlike Examples 1-5. In addition, the PVdF-HFP used as a binder resin has a molecular weight ($M_w$) of 450,000 g/mol. The slurry was applied to a separator (polyethylene, porosity 45%, thickness 9 μm) at a loading amount of 15 g/m² based on the area of the separator and dried under a humidified condition of a relative humidity of 55%. Then, the dried product was cut into a size of 60 mm (length)×25 mm (width) to obtain a separator.

Comparative Example 2

First, $Al_2O_3$, PVdF-HFP (Arkema) and a dispersing agent (cyanoethyl polyvinyl alcohol) were introduced to acetone at a weight ratio of 90:9:1 to obtain slurry for forming an inorganic coating layer. The PVdF-HFP has a HFP substitution ratio of 8 wt %. Meanwhile, the PVdF-HFP includes no acrylic compound-derived functional group introduced thereto, unlike Examples 1-5. In addition, the PVdF-HFP used as a binder resin has a molecular weight ($M_w$) of 380,000 g/mol. The slurry was applied to a separator (polyethylene, porosity 45%, thickness 9 μm) at a loading amount of 15 g/m² based on the area of the separator and dried under a humidified condition of a relative humidity of 55%. Then, the dried product was cut into a size of 60 mm (length)×25 mm (width) to obtain a separator.

Comparative Example 3

First, $Al_2O_3$, PVdF-HFP (Arkema) and a dispersing agent (cyanoethyl polyvinyl alcohol) were introduced to acetone at a weight ratio of 90:9:1 to obtain slurry for forming an inorganic coating layer. The PVdF-HFP has a HFP substitution ratio of 22 wt %. In addition, the PVdF-HFP used as a binder resin has a molecular weight ($M_w$) of 400,000 g/mol. The slurry was applied to a separator (polyethylene, porosity 45%, thickness 9 μm) at a loading amount of 15 g/m² based on the area of the separator and dried under a humidified condition of a relative humidity of 55%. Then, the dried product was cut into a size of 60 mm (length)×25 mm (width) to obtain a separator.

(2) Manufacture of Electrode

Natural graphite, styrene butadiene rubber (SBR) and carboxymethyl cellulose (CMC) (weight ratio 90:9:1) were introduced to water to obtain negative electrode slurry. The negative electrode slurry was applied onto copper film (thickness 10 μm) at a loading amount of 125 mg/cm², followed by drying. Then, the resultant product was pressed to a thickness of 90 μm and cut into a size of 60 mm (length)×25 mm (width) to obtain a negative electrode.

(3) Result Analysis

1) Evaluation of Binder-Electrode Adhesion

The binder resin used in each of Examples 1-5 and Comparative Examples 1-3 was introduced to dimethyl carbonate (DMC) to obtain a binder solution. The binder solution was applied to a glass plate (thickness 200 μm) at a loading amount of 4 g/cm², followed by drying. Next, the resultant product was cut into a size of 60 mm (length)×25 mm (width) to obtain a binder film. The binder film was disposed on the surface of the negative electrode prepared from the preparation example and lamination was carried out at a temperature of 90° C. under a pressure of 8.5 MPa to prepare a specimen. The specimen was cut into a size of 70 mm (length)×15 mm (width) and adhered to a glass plate to which a double-sided tape was applied in such a manner that the electrode surface might be attached to the glass plate to provide a specimen. Each specimen was fixed to an adhesion strength tester (LLOYD Instrument, LF plus) and the upper separator specimen was peeled off at 25° C. and a rate of 15 mm/min with an angle of 180°, and the strength was measured.

2) Adhesion to Electrode ((−)-Adhesion)

2-1) Dry Adhesion

The separator according to each of Examples 1-5 and Comparative Examples 1-3 was cut into a size of 70 mm (length)×25 mm (width) and laminated with the negative electrode prepared as described above by using a press at 70° C. under 4 MPa to obtain a specimen. The specimen was attached and fixed to a glass plate by using a double-sided tape in such a manner that the negative electrode might face the glass plate. The separator portion of the specimen was peeled off at 25° C. and a rate of 15 mm/min with an angle of 180°, and the strength was measured.

2-2) Wet Adhesion

The separator according to each of Examples 1-5 and Comparative Examples 1-3 was cut into a size of 70 mm (length)×25 mm (width) and laminated with the negative electrode prepared as described above by using a press at 70° C. under 4 MPa to obtain a specimen. The specimen was introduced to a battery casing together with an electrolyte and allowed to stand therein for 4 hours so that the specimen might be impregnated with the electrolyte. The electrolyte includes 1M $LiPF_6$ dissolved in ethylene carbonate and propionate mixed at a volume ratio of 7:3. Then, the specimen was removed from the casing, and then attached and fixed to a glass plate by using a double-sided tape in such a manner that the negative electrode might face the glass plate. The separator portion of the specimen was peeled off at 25° C. and a rate of 15 mm/min with an angle of 180°, and the strength was measured.

3) Determination of Heat Shrinkage 3-1) Determination of Dry Heat Shrinkage

The separator according to each of Examples 1-5 and Comparative Examples 1-3 was cut into a size of 70 mm (length)×25 mm (width) and laminated with the negative electrode prepared as described above by using a press at 70° C. under 4 MPa to obtain a specimen. Each specimen was allowed to stand in an oven at 150° C. for 30 minutes and its shrinkage was measured in the machine direction and in the transverse direction. Herein, shrinkage was calculated through the following [Mathematical Formula 1].

Heat shrinkage (%)=[(Length before heat shrinking−Length after heat shrinking)/Length before heat shrinking]×100    [Mathematical Formula 1]

3-2) Determination of Wet Heat Shrinkage

The separator according to each of Examples 1-5 and Comparative Examples 1-3 was cut into a size of 70 mm (length)×25 mm (width) and laminated with the negative electrode prepared as described above by using a press at 70° C. under 4 MPa to obtain a specimen. The specimen was introduced to a battery casing together with an electrolyte and allowed to stand therein for 4 hours so that the specimen might be impregnated with the electrolyte. The electrolyte includes 1M $LiPF_6$ dissolved in ethylene carbonate and propionate mixed at a volume ratio of 7:3. Then, the specimen was removed from the casing, and then allowed to stand in an oven at 150° C. for 30 minutes and its shrinkage was measured in the machine direction and in the transverse direction. Herein, shrinkage was calculated through [Mathematical Formula 1].

The following Table 1 shows the results of determination of adhesion and heat shrinkage.

As can be seen from Table 1, the separators according to Examples 1-5 show higher peel strength and adhesion to an electrode, as compared to the separators according to Comparative Examples 1-3. Particularly, it can be seen that the separators according to Comparative Examples realize no adhesion to an electrode, in a wet state. In addition, it can be seen that, in the case of heat shrinkage, the separators according to Examples 1-5 show a decrease in heat shrinkage, both in a dry state and in a wet state.

When using the same thickness and the same loading amount, a separator having higher adhesion between a separator substrate and an inorganic coating layer shows a lower heat shrinkage. A separator substrate based on polymeric materials shows a property (shrinking property) of recovering its state before orientation, once it is heated. In the case of a separator having an inorganic coating layer formed on the surface of the separator substrate, the separator substrate is attached better to the inorganic coating layer, as the binding force between the separator substrate and the inorganic coating layer is increased. Thus, the inorganic coating layer functions to fix the separator substrate. Therefore, even when heat is applied to the separator, the separator substrate is prevented from shrinking, and thus the separator can retain its original shape without shrinking. It can be seen that each of the separators of Examples 1-5 according to the present disclosure shows excellent binding force between the separator substrate and the inorganic coating layer both in a dry state and in a wet state, and thus provides a lower heat shrinkage in both states.

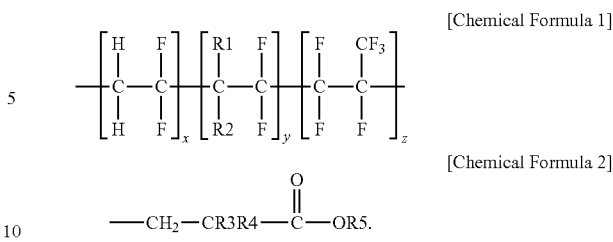

[Chemical Formula 1]

[Chemical Formula 2]

2. The separator for an electrochemical device according to claim 1, wherein the main chain of the PVdF-based polymer comprises a copolymer of vinylidene fluoride with a monomer copolymerizable with vinylidene fluoride, wherein the monomer is at least one selected from: trifluoroethylene (TrFE); chlorofluoroethylene (CTFE); 1,2-difluoroethylene; tetrafluoroethylene (TFE); hexafluoropropylene (HFP); perfluoro(alkylvinyl)etherperfluoro (1,3-dioxole); or perfluoro (2,2-dimethyl-1,3-dioxole (PDD), and wherein a substitution ratio with the monomer is 1-20 wt %.

TABLE 1

| Adhesion | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|
| Binder sheet electrode adhesion Peel strength (gf/15 mm) | 84 | 102 | 121 | 87 | 95 | 35 | 33 | 50 |
| (Dry) SRS Electrode adhesion (gf/15 mm) | 60 | 82.3 | 90 | 67.3 | 75.2 | 59 | 40 | 20 |
| (Wet) SRS Electrode adhesion (gf/15 mm) | 17 | 22 | 24.5 | 18.3 | 20.7 | Not measurable | Not measurable | Not measurable |
| Heat shrinkage (machine direction/transverse direction (%)) | 9.5/7 | 11.3/9.7 | 14.5/12.3 | 9/6.3 | 10/7 | 11.7/10 | 12.3/11.7 | 16.7/14 |
| (Wet) Heat shrinkage after adhesion (machine direction/transverse direction (%)) | 5/3.3 | 6/5.3 | 7/6.7 | 4.3/2.7 | 5.3/4 | 8.5/7 | 9/10.5 | 15.3/12.7 |

What is claimed is:

1. A separator for an electrochemical device, comprising:
   a porous polymer substrate; and
   an inorganic coating layer formed on at least one surface of the porous polymer substrate,
   wherein the inorganic coating layer comprises inorganic particles and a binder resin,
   wherein the binder resin comprises a polyvinylidene fluoride (PVdF)-based polymer having a main chain,
   wherein at least one hydrogen atom in the main chain of the PVdF-based polymer is substituted with an acrylic compound-derived functional group, and
   wherein the polyvinylidene fluoride (PVdF)-based polymer comprises a polymer represented by the following Chemical Formula 1, wherein each of R1 and R2 independently represents a group represented by the following Chemical Formula 2, and each of R3, R4 and R5 is independently substituted with a functional group having at least one hydrogen bound to each carbon atom, and the functional group is at least one selected from the group consisting of ester, ketone, hydroxyl, ether, carboxyl and carbonyl groups, 3. The separator for an electrochemical device according to claim 1, wherein the acrylic compound-derived functional group is derived from at least one selected from the group consisting of (meth)acrylic acid, (meth)acrylate, propyl acrylate, isopropyl acrylate, n-butyl acrylate, isobutyl acrylate, n-amyl acrylate, isoamyl acrylate, n-ethylhexyl acrylate, 2-ethylhexyl acrylate, 2-hydroxyethyl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, n-ethylhexyl methacrylate, 2-ethylhexyl methacrylate, hydroxyethyl methacrylate, (meth)acrylonitrile butyl (meth)acrylate, 2-ethylhexyl (meth)acrylate, ethyl (meth)acrylate, methyl (meth)acrylate, n-propyl (meth)acrylate, isopropyl (meth)acrylate, t-butyl (meth) acrylate, pentyl (meth)acrylate, n-octyl (meth)acrylate, isooctyl (meth)acrylate, isononyl (meth)acrylate, lauryl (meth)acrylate, tetradecyl (meth)acrylate and dimethyl 2-methylenepentanedionate hydroxypropyl methacrylate.

4. The separator for an electrochemical device according to claim 1, wherein the PVdF polymer comprises the acrylic compound-derived functional group at a ratio of 0.1 wt % to 5 wt % based on 100 wt % of the PVdF polymer.

5. The separator for an electrochemical device according to claim 1, wherein the PVdF-based polymer has a weight average molecular weight of 100,000 to 600,000.

6. The separator for an electrochemical device according to claim 1, wherein the inorganic coating layer comprises the inorganic particles in an amount of 50 wt % or more based on 100 wt % of a total weight of the inorganic particles and the binder resin.

7. The separator for an electrochemical device according to claim 1, wherein a portion of the inorganic coating layer at a surface of the inorganic coating layer opposite the porous polymer substrate forms an electrode adhesive portion, wherein the electrode adhesive portion has a content of binder resin that is higher than a content of binder resin in the remainder of the inorganic coating layer adjacent to the porous polymer substrate.

8. The separator for an electrochemical device according to claim 1, wherein the inorganic particles in the inorganic coating layer are bound to each other by the binder resin,
wherein the inorganic coating layer has a plurality of micropores derived from interstitial volumes formed among the inorganic particles,
wherein the inorganic coating layer has an electrode adhesive portion having a content of binder resin that is higher than the remainder of the inorganic coating layer adjacent to the porous polymer substrate, and
wherein the electrode adhesive portion is formed on a surface portion of the inorganic coating layer opposite the porous polymer substrate, and the inorganic coating layer and the electrode adhesive portion are bound integrally and indivisibly to each other.

9. The separator for an electrochemical device according to claim 7, wherein the electrode adhesive portion is formed by a phase separation process of the binder resin, while drying the separator under a humidified condition.

10. The separator for an electrochemical device according to claim 9, wherein the humidified condition comprises a relative humidity of 40% to 80%.

11. An electrochemical device comprising:
a negative electrode;
a positive electrode; and
a separator interposed between the negative electrode and the positive electrode,
wherein the separator is as defined in claim 1.

12. The separator for an electrochemical device according to claim 7, wherein the electrode adhesive portion is integral and indivisible from the remainder of the inorganic coating layer adjacent to the porous polymer substrate, and wherein the electrode adhesive portion comprises the binder resin in an amount of 70 wt % or more from a topmost portion in a thickness direction of the inorganic coating layer.

13. The separator for an electrochemical device according to claim 8, wherein the electrode adhesive portion comprises the binder resin in an amount of 70 wt % or more from a topmost portion in a thickness direction of the inorganic coating layer.

* * * * *